(12) United States Patent
Larsson et al.

(10) Patent No.: US 9,842,242 B1
(45) Date of Patent: Dec. 12, 2017

(54) METHOD AND FINGERPRINT SENSING SYSTEM FOR DETERMINING FINGER MOVEMENT EVENT

(71) Applicant: Fingerprint Cards AB, Göteborg (SE)

(72) Inventors: Andreas Larsson, Herrljunga (SE); David Carling, Mölndal (SE); Fredrik Ramberg, Göteborg (SE); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/622,236

(22) Filed: Jun. 14, 2017

(30) Foreign Application Priority Data

Jul. 25, 2016 (SE) .................... 16510836

(51) Int. Cl.
*G06K 9/00* (2006.01)

(52) U.S. Cl.
CPC ....... *G06K 9/0002* (2013.01); *G06K 9/00067* (2013.01)

(58) Field of Classification Search
None
See application file for complete search history.

(56) References Cited

U.S. PATENT DOCUMENTS

| 6,681,033 | B1* | 1/2004 | Yano | G01D 5/24 382/108 |
| 7,463,756 | B2 | 12/2008 | Benkley | |
| 7,864,992 | B2* | 1/2011 | Riedijk | G06K 9/0002 382/124 |
| 8,031,046 | B2 | 10/2011 | Franza et al. | |
| 9,589,171 | B1* | 3/2017 | Larsson | G06K 9/0002 |
| 9,600,705 | B2* | 3/2017 | Riedijk | G06K 9/0002 |
| 2001/0025532 | A1* | 10/2001 | Kramer | A61B 5/1172 73/862.68 |
| 2006/0097991 | A1 | 5/2006 | Hotelling et al. | |
| 2010/0321337 | A1 | 12/2010 | Liao et al. | |
| 2011/0096025 | A1* | 4/2011 | Slobodin | G06F 3/044 345/174 |
| 2012/0194445 | A1 | 8/2012 | Chang et al. | |
| 2012/0200530 | A1 | 8/2012 | Wu et al. | |
| 2013/0271422 | A1* | 10/2013 | Hotelling | G06F 3/044 345/174 |

(Continued)

OTHER PUBLICATIONS

Koundinya, P., et al., "Multi resolution touch panel with built-in fingerprint sensing support", 2014 Design, Automation & Test in Europe Conference & Exhibition (Mar. 24, 2014).

(Continued)

*Primary Examiner* — Hadi Akhavannik
(74) *Attorney, Agent, or Firm* — RMCK Law Group PLC (57) ABSTRACT

The present invention relates to a method for determining a finger movement event on a fingerprint sensor. The method comprises to acquire signals indicative of the portion of finger detecting structures that may be touched by a finger. Based on the ratio between the signals and a total signal level, the position of the finger on the fingerprint sensing device can be determined at two different time instances. Based on the positions which may be the same, a finger movement event may be determined. The invention also relates to a corresponding fingerprint sensing device.

18 Claims, 9 Drawing Sheets

(56) References Cited

U.S. PATENT DOCUMENTS

| | | | |
|---|---|---|---|
| 2014/0266262 A1* | 9/2014 | Taghibakhsh | G06K 9/0002 |
| | | | 324/686 |
| 2014/0270413 A1 | 9/2014 | Slaby et al. | |
| 2014/0333328 A1 | 11/2014 | Nelson et al. | |
| 2015/0070137 A1 | 3/2015 | Minteer et al. | |
| 2015/0091859 A1 | 4/2015 | Rosenberg et al. | |
| 2015/0189214 A1* | 7/2015 | Kurose | H01L 25/18 |
| | | | 250/208.1 |
| 2015/0301714 A1 | 10/2015 | Rimon et al. | |

OTHER PUBLICATIONS

Swedish Search Report for Swedish Application No. 1651083-6 dated Mar. 30, 2017, 3 pages.

\* cited by examiner

METHOD AND FINGERPRINT SENSING SYSTEM FOR DETERMINING FINGER MOVEMENT EVENT

FIELD OF THE INVENTION

The present invention relates to a method for determining a finger movement event on a fingerprint sensor. The present invention further relates to a corresponding fingerprint sensing system and to an electronic device comprising such a fingerprint sensing system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

To provide for a low energy consumption of the fingerprint sensing system, the fingerprint sensing system should only operate when there is a finger on the fingerprint sensing device comprised in the fingerprint sensing system. On the other hand, the fingerprint sensing system may be required to independently determine whether or not a finger is present on the sensing device and to sense the fingerprint pattern of the finger when the finger is placed on the sensing device.

U.S. Pat. No. 8,031,046 discloses a finger sensing device in which finger sensing electrodes may be bussed together and connected to a bussed electrode amplifier which is typically maintained on. A sample and hold and decoder circuit is connected to the bussed electrode amplifiers and may output an average power from the bussed group of electrodes that is compared with a threshold level. If the average power is higher than the threshold level, it is determined that the finger is present, and a fingerprint image is acquired.

Although the solution proposed by U.S. Pat. No. 8,031,046 seems to provide for a rather energy-efficient finger detect functionality, there still appears to be room for improvement.

SUMMARY

In view of above-mentioned and other drawbacks of the prior art, it is an object of the present invention to provide an improved finger detect procedure and such a fingerprint sensing system, in particular providing for more energy efficient operation of the fingerprint sensing system.

According to a first aspect of the present invention, it is therefore provided a method for determining a finger movement event on a fingerprint sensor, the fingerprint sensor comprising: an array of sensing elements for sensing a fingerprint pattern each sensing element having a sensing structure arranged in a sensing structure plane, and at least a first finger detecting structure and a second finger detecting structure arranged adjacent to the array of sensing structures, each finger detecting structure having a substantially larger surface area than each of the sensing structures, the first finger detecting structure being connected to finger detector circuitry configured to generate a signal indicative of a finger touching at least part of the first finger detecting structure, wherein a magnitude of the first signal is indicative of the portion of the first finger detecting structure being touched by the finger, the second finger detecting structure being connected to (a second) finger detecting circuitry configured to generate a signal indicative of a finger touching at least part of the second finger detecting structure, wherein a magnitude of the second signal is indicative of the portion of the second finger detecting structure being touched by the finger, wherein the method comprises the steps of: acquiring a first signal indicative of the portion of the first finger detecting structure being touched by a finger, acquiring a second signal indicative of a portion of the second finger detecting structure being touched by the finger, determining a total signal level based on at least the first signal and the second signal, determining a first signal ratio between the first signal and the total signal, determining a second signal ratio between the second signal and the total signal, determining, based on the first signal ratio and the second signal ratio, a first position with respect to the first finger detecting structure and the second finger detecting structure, and a second position with respect to the first finger detecting structure and the second finger detecting structure, the second position being determined at a time later than the first position; and determining, based on the first position and the second position, a finger movement event.

The term "total signal" should be interpreted broadly and may for example be a sum of the first and the second signal, or an in another way accumulated total signal from the first and the second signal. The total signal may be a sum of voltages (or currents) from the finger detection circuitries.

The first position may be determined as a gravity point based on a weighted sum of the first and the second ratio and a coordinate system with the first and the second finger detecting structures as boundaries for the coordinate system. For example, a distance from the first finger detecting structure to the first position may be related to the first ratio, and a distance from the second finger detecting structure to the first position may be related to the second ratio. As an example, a large ratio may indicate that the first position is closer to the respective finger detecting structure compared to a small ratio.

As a further example, the coordinate system may be based on a virtual division of the area between the finger detecting structures in equal portions, where the number of portions is the same as the number of finger detecting structures.

The portion of the first finger detecting structure being touched by a finger may range from zero, i.e. the finger detecting structure is not touched at all to that the entire finger detecting structure is being touched. The "portion" of the finger detecting structure is meant to be part of the area of one side of the finger detecting structure.

The acquired signals are meant as signals that are sampled at a sampling rate over a time duration. In this way, a first position and a second position may be determined by using data points (or an average of a plurality of data points) at two different time instances.

The sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal or piezo-electric fingerprint sensors etc.

The fingerprint sensor may comprise additional circuitry for operating on the sensing signals indicative of the fingerprint pattern provided by the sensing elements. Such additional circuitry, which may for instance include sampling circuitry and analog-to-digital conversion circuitry. Thus, the fingerprint sensor may thus provide a fingerprint pattern signal as a digital signal. Alternatively, the fingerprint pattern signal may be provided as an analog signal.

The acquired signals may be analog or digital values indicative of a voltage, which may in turn be proportional to the capacitance of the capacitor constituted by the finger (or other conductive object in the vicinity of the finger detecting structure), the finger detecting structure and the dielectric material there between.

The finger detecting structure may advantageously be provided in the form of a metal plate that is substantially larger (greater area) than a sensing structure comprised in a sensing element. For instance, the finger detecting structure may be at least 20 times larger than a sensing structure, or more preferably at least 100 times larger. Hereby, the capacitive coupling between the finger detecting structure and the possible finger will be correspondingly stronger than the capacitive coupling between a sensing structure and the possible finger.

The sensed fingerprint pattern may be used for various purposes, such as biometric enrollment or authentication, or fingerprint pattern based navigation etc.

The present invention is based upon the realization that a low power finger detect method and system can be provided by using additional finger detecting structures with dedicated finger detecting circuitry connected to the at least one finger detecting structure not being part of the sensing element matrix (i.e. pixel matrix) of the fingerprint sensing device. Thus, instead of using the sensing element matrix which require substantial power to operate, the inventors realized that by using additional finger detecting structures, the power consumption can be reduced since the sensing element matrix can remain in an in-active mode. Furthermore, it was realized that the finger detecting structures may be used for detecting movements of the finger on the fingerprint sensing device. Thus, the finger detecting structures can be used for movement detection, stability and navigation determinations. In addition, the present invention is further based upon the realization that it is advantageous to utilize a dimensionless signal ratio for movement detection, stability and navigation determinations because a ratio is insensitive to the absolute signal level, thereby less care has to be taken to the absolute signal level which may be influenced by noise, such as common mode noise. For example, by utilizing a ratio, low signal levels have less influence on the determined movement events.

According to an embodiment, the finger movement event may be a movement of the finger in a direction from the first position to the second position.

In another embodiment, when the first position and the second position may be substantially equal and each of the magnitude of the first signal the magnitude of the second signal are first above a first threshold level during a first time duration and subsequently below a second threshold level for a second time duration, determining that the finger movement event is a substantially vertical movement of the finger. A vertical movement of the finger may be considered a "click-event". Thus, in such case the finger movement event is determined to be a click-event. A click-event should be understood to mean a selection instruction on an electronic device, e.g. of the type "clicking on the mouse". The click-event may also be a so-called "hold-click" event by requiring that the first time duration is longer than for a normal click-event. That the first position and the second position are substantially equal may be interpreted as that the first position and the second position at least partly overlap. The first and the second position are substantially equal at least for the first time duration. During the second time duration, the finger may not even be touching the finger detecting structures. The first threshold level may be such that it the presence of a finger on the finger detecting structure can be determined. Furthermore, the magnitude of the first and the second signal may be required to be below a threshold during the first time duration such that it can be determined that the finger is stable on the finger detecting structures. Furthermore, it may optionally firstly be determined that no finger is present for an initial time duration, thus that the signal magnitudes from the finger detecting structures are below a threshold for the initial time duration. Secondly, it may be determined that the first magnitude and the second magnitude are above a first threshold level during the first time duration, and thirdly, that no finger is present for a time duration. This provides an even more accurate determination of a click-event.

On one embodiment, when the first position and the second position are substantially equal and the total signal magnitude is first above a first threshold level during a first time duration and subsequently below a second threshold level for a second time duration, determining that the finger movement event is a substantially vertical movement of the finger. In other words, the total signal is used for determining the vertical movement. Thereby, the movement event determination becomes less sensitive to the individual signals.

In yet another embodiment, it may be included that when the first position and the second position are substantially equal and each of the magnitude of the first signal the magnitude of the second signal are subsequently above the first threshold level during a third time duration and subsequently below a fourth threshold level for a fourth time duration, determining that the finger movement event is a substantially vertical repetitive movement of the finger. With this embodiment the finger movement event may further be determined to be double click event. Further, it is also a possibility to use the total signal for determining the repetitive movement instead of the individual signals.

According to one embodiment of the invention, it may further be included that when the first position and the second position are substantially equal for a stability time duration and a variation of the magnitude of the total signal level is within a stability deviation with respect to a stability level during the stability time duration determining that the finger movement event is that the finger is stable on the fingerprint sensor.

In other words, the finger movement event is an absence of a movement. For the stability condition of the finger to be fulfilled, the total signal from the finger detecting circuits is required to not deviate from the stability level more than a stability deviation during the stability time duration. Furthermore, the total signal level may be required to be constant during the stability time period. In this way, the vertical movement of the finger can be determined to be stable. When the finger has been determined to be stable, the fingerprint sensor may be controlled to acquire a fingerprint image. Thereby, the fingerprint image quality may be improved.

In a further embodiment, when the finger is determined to be stable and when the first ratio and the second ratio are substantially equal for the stability time duration, the fingerprint sensor may be controlled to acquire a fingerprint image. With the first ratio and the second ratio substantially equal, the finger is touching equal portions of the first and the second finger detecting structures, thereby the location of the finger may be equally distanced with respect to the first and the second finger detecting structures. With even further finger detecting structures, for example four finger detecting structures surrounding the sensing elements of the fingerprint sensor, the finger may be determined to be centralized on the array of sensing elements. Thereby, the fingerprint image quality may be further improved by requiring that the finger is central on the sensing element array.

In another embodiment, the method may further comprise: when the first position and the second position are substantially equal for a navigation time duration, and each of the magnitude of the first signal the magnitude of the second signal are above a navigation threshold level during a navigation time duration, determining that the finger movement event is that the finger is stable; and providing, based on the first position and the second position, a signal indicative of a navigation operation. Thus, the location of the sensor with respect to the finger detecting structures is used to determine a navigation operation. A navigation operation may for example be scrolling through a menu in the electronic device, of navigation in the operating system, or software running on the electronic device. In other words, the navigation operation is similar to a joystick scrolling, e.g. maintaining the joystick in a position e.g. to the left/right/up/down provides a navigation operation in the respective direction.

According to an embodiment, the method may further comprise: when a magnitude of the first signal or the second signal is above or equal to a detection threshold, determining that the finger is touching the respective finger detecting structure. The detection threshold is pre-determined and is set such that noise is not mistaken as a finger on the finger detecting structure. For example, in some implementations there may be a metal housing surrounding the fingerprint sensor or surrounding at least part of the electronic device which comprises the fingerprint sensor. A coupling between the finger and such hosing may provide a static background signal. The detection threshold may thus be selected such that this background signal is below the threshold. Alternatively, the background signal may be used as a detection threshold. The signal from a finger detecting circuitry may be compared with a detection threshold in e.g. comparator of the fingerprint sensing device.

In one embodiment, the fingerprint sensor may further comprise at least a third finger detecting structure and a fourth finger detecting structure, wherein each finger detecting structure having a substantially larger surface area than each of the sensing elements, the third finger detecting structure being connected to a third finger detector circuitry configured to generate a signal indicative of a finger touching at least part of the third finger detecting structure, wherein a magnitude of the third signal is indicative of the portion of the third finger detecting structure being touched by the finger, the fourth finger detecting structure being connected to a fourth finger detector circuitry configured to generate a signal indicative of a finger touching at least part of the fourth finger detecting structure, wherein a magnitude of the fourth signal is indicative of the portion of the fourth finger detecting structure being touched by the finger, wherein the method further comprises the steps of: acquiring a third signal indicative of the portion of the third finger detecting structure being touched by a finger, acquiring a fourth signal indicative of the portion of the fourth finger detecting structure being touched by a finger, determining a total signal level based on the first signal, the second signal, the third signal, and the fourth signal determining a third signal ratio between the third signal and the total signal, determining a fourth signal ratio between the fourth signal and the total signal, determining, based on the first signal ratio, the second signal ratio, the third single ratio, and the fourth signal ratio, the first position with respect to the finger detecting structures, and the second position with respect to the finger detecting structures; and determining, based on the first position and the second position, the finger movement event. By using more finger detecting structures, the accuracy or the finger movement event determination can be further improved.

Furthermore, it is even further advantageous to include even more finger detecting structures, such as e.g. eight finger detecting structures, for example arranged with two on each side of the array of sensing elements. This way, movement of finger in at least one direction is possible to determine with finger detecting structures on a single side of the array of sensing elements.

Generally, two finger detecting structures are needed to determine movement in one dimension (from on finger detecting structure to another finger detecting structure) and also in a second dimension vertically with respect to the finger detecting structures. With at least three finger detecting structures, movement in two dimensions in the plane of the finger detecting structures is possible in addition to determining movement in the vertical dimension.

According to a second aspect of the present invention, there is provided a fingerprint sensing system comprising: an array of sensing elements for sensing a fingerprint pattern each sensing element having a sensing structure arranged in a sensing structure plane, and at least a first finger detecting structure and a second finger detecting structure arranged adjacent to the array of sensing structures, each finger detecting structure having a substantially larger surface area than each of the sensing elements, the first finger detecting structure being connected to a first finger detector circuitry configured to generate a signal indicative of a finger touching at least part of the first finger detecting structure, wherein a magnitude of the first signal is indicative of the portion of the first finger detecting structure being touched by the finger, the second finger detecting structure being connected to a second finger detector circuitry configured to generate a signal indicative of a finger touching at least part of the second finger detecting structure, wherein a magnitude of the second signal is indicative of the portion of the second finger detecting structure being touched by the finger, wherein the fingerprint sensing system is configured to: acquire a first signal indicative of the portion of the first finger detecting structure being touched by a finger, acquire a second signal indicative of a portion of the second finger detecting structure being touched by the finger, determine a total signal level based on at least the first signal and the second signal, determine a first signal ratio between the first signal and the total signal, determine a second signal ratio between the second signal and the total signal, determine, based on the first signal ratio and the second signal ratio, a first position with respect to the first finger detecting structure and the second finger detecting structure, and a second position with respect to the first finger detecting structure and the second finger detecting structure, the second position being determined at a time later than the first position; and determine, based on the first position and the second position, a finger movement event.

According to a further embodiment of the invention, the fingerprint sensor may further comprise at least a third finger detecting structure and a fourth finger detecting structure, wherein each finger detecting structure having a substantially larger surface area than each of the sensing elements, the third finger detecting structure being connected to a third finger detector circuitry configured to generate a signal indicative of a finger touching at least part of the third finger detecting structure, wherein a magnitude of the third signal is indicative of the portion of the third finger detecting structure being touched by the finger, the fourth finger detecting structure being connected to a fourth finger detector circuitry configured to generate a signal indicative of a finger touching at least part of the fourth finger detecting structure, wherein a magnitude of the fourth signal is indicative of the portion of the fourth finger detecting structure being touched by the finger, wherein the fingerprint sensing system is configured to: acquire a third signal indicative of the portion of the third finger detecting structure being touched by a finger, acquire a fourth signal indicative of the portion of the fourth finger detecting structure being touched by a finger, determine a total signal level based on the first signal, the second signal, the third signal, and the fourth signal determine a third signal ratio between the third signal and the total signal, determine a fourth signal ratio between the fourth signal and the total signal, determine, based on the first signal ratio, the second signal ratio, the third single ratio, and the fourth signal ratio, the first position with respect to the finger detecting structures, and the second position with respect to the finger detecting structures; and determine, based on the first position and the second position, the finger movement event.

In one embodiment, the finger detecting structures may be arranged at least partly surrounding the sensing structure in the sensing structure plane, the finger detecting structures being arranged in opposing pairs with respect to the sensing structures. In other words, there may be one finger detecting structure arranged adjacent to each side of the array of sensing elements.

Each of the finger detecting structures may be a capacitive plate for sensing a capacitive coupling between the finger and the capacitive plate.

The fingerprint sensor and the finger detecting structures may be integrated in the same die. Thus, manufactures on the same chip.

Further embodiments of, and effects obtained through this second aspect of the present invention are largely analogous to those described above for the first aspect of the invention.

According to a third aspect of the invention, there is provided an electronic device comprising: a control unit; and a fingerprint sensing system according to the second aspect.

The fingerprint sensor may be a capacitive fingerprint sensor.

The electronic device may be a mobile phone.

Further embodiments of, and effects obtained through this third aspect of the present invention are largely analogous to those described above for the first aspect and the second aspect of the invention.

In summary, the present invention relates to a method for determining a finger movement event on a fingerprint sensor. The method comprises to acquire signals indicative of the portion of finger detecting structures that may be touched by a finger. Based on the ratio between the signals and a total signal level, the position of the finger on the fingerprint sensing device can be determined at two different time instances. Based on the positions which may be the same, a finger movement event may be determined. The invention also relates to a corresponding fingerprint sensing device.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a mobile phone having an integrated fingerprint sensor. Although this is convenient for many applications, it should be noted that many other kinds of electronic devices are applicable such as tablets, laptops, desktop computers, etc. Furthermore, the fingerprint sensing device is herein exemplary described having four finger detecting structures, however, other number of finger detecting structures is also applicable such as two, three, five, six, seven, eight, etc.

Figure 1:
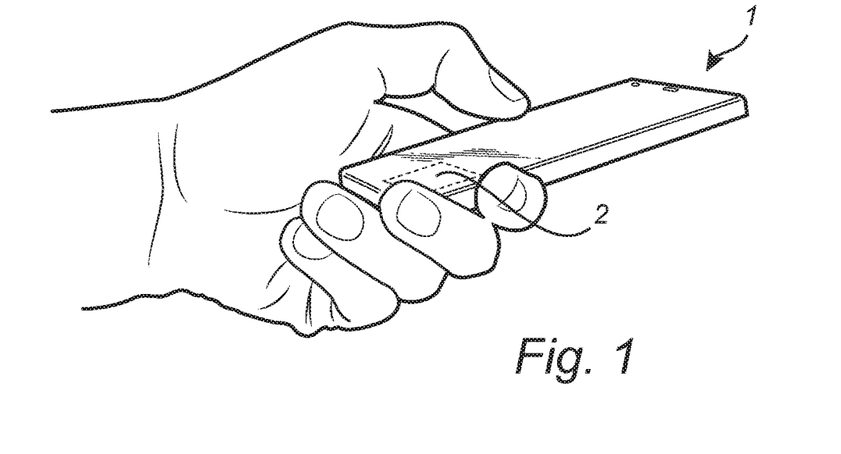
FIG. 1 schematically illustrates an application for a fingerprint sensing device according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
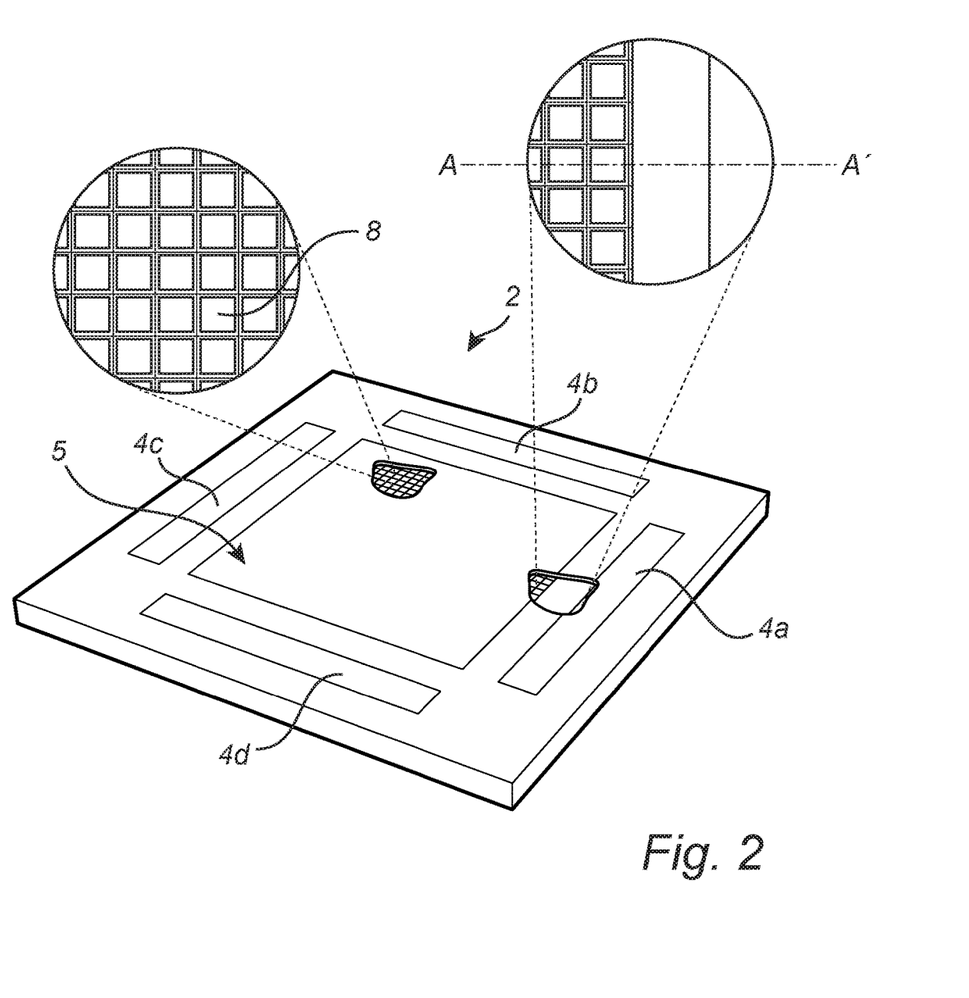
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, and finger detecting structures 4a-d. Although not shown in FIG. 2, the fingerprint sensing device 2 further comprises a power supply interface 6 and a communication interface 7. The sensor array 5 comprises a large number of sensing elements 8 (only one of the sensing elements has been indicated with a reference numeral to avoid cluttering the drawing), each being controllable to sense a distance between a sensing structure comprised in the sensing element 8 and the surface of a finger contacting the top surface of the sensor array 5.

In a battery powered electronic device, such as the mobile phone 1 in FIG. 1, keeping the energy consumption of various sub-systems, including the fingerprint sensing device 2, as low as possible is of utmost importance. In particular, the energy consumption of sub-systems that are not used during a given time period should be zero or close to zero during that time period.

Therefore, although not shown in FIG. 2, the fingerprint sensing device 2 in FIG. 2 is also provided with circuitry for determining if there is a finger present on the fingerprint sensing device and to activate the fingerprint sensing device when a finger is determined to be present so that the fingerprint sensing device can be in a very low power state between finger detection events.

Figure 3:
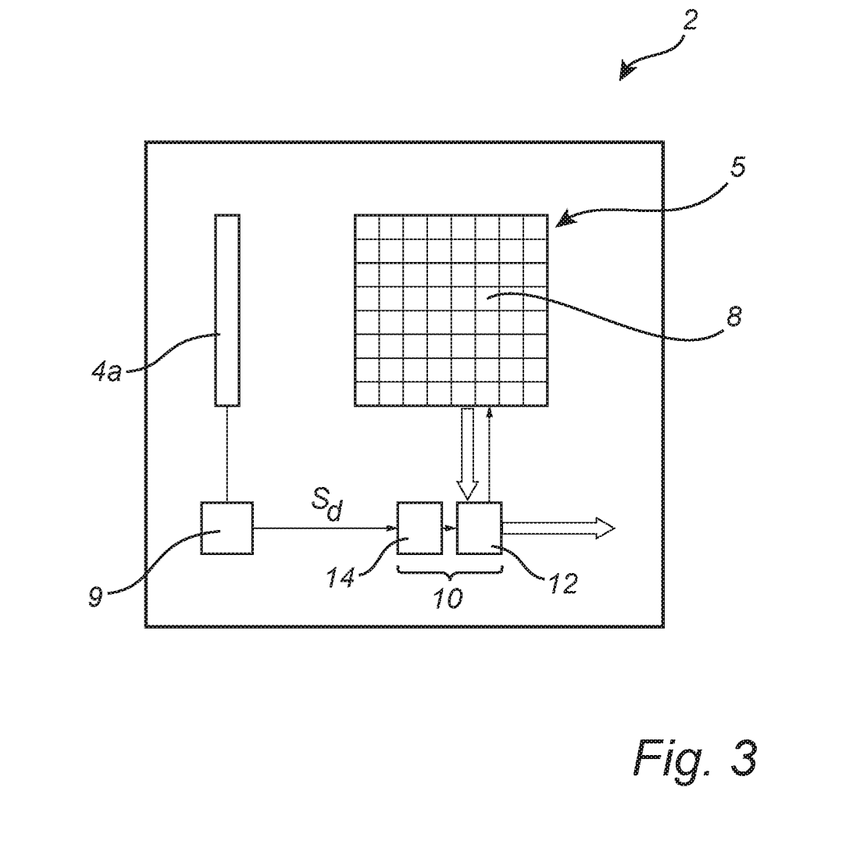
FIG. 3 is a block diagram of the fingerprint sensing device in FIG. 2.

Referring to the block diagram in FIG. 3, the fingerprint sensing device 2 comprises, in addition to the sensor array 5 and finger detecting structures 4a-d shown in FIG. 2, a finger detector circuit 9, and operation control circuitry 10 including a finger detection evaluation circuit 14 and an image acquisition control circuit 12. The finger detector circuit 9 is connected to the finger detecting structure 4a for providing a finger detection signal $S_d$ indicative of a capacitive coupling between the finger detecting structure 4a and an object (such as a finger) approaching the finger detecting structure 4a. In FIG. 3, only one of the finger detecting structures 4a is shown. The additional finger detecting structures 4b-d may all be connected to the same finger detector circuit 9, or each finger detecting structure may be connected to its own finger detector circuit.

As is schematically shown in FIG. 3, the finger detection evaluation circuit 14 is connected to the finger detector circuit 9 and to the image acquisition control circuit 12. The image acquisition control circuit 12 is connected to the sensor array 5.

Figure 4:
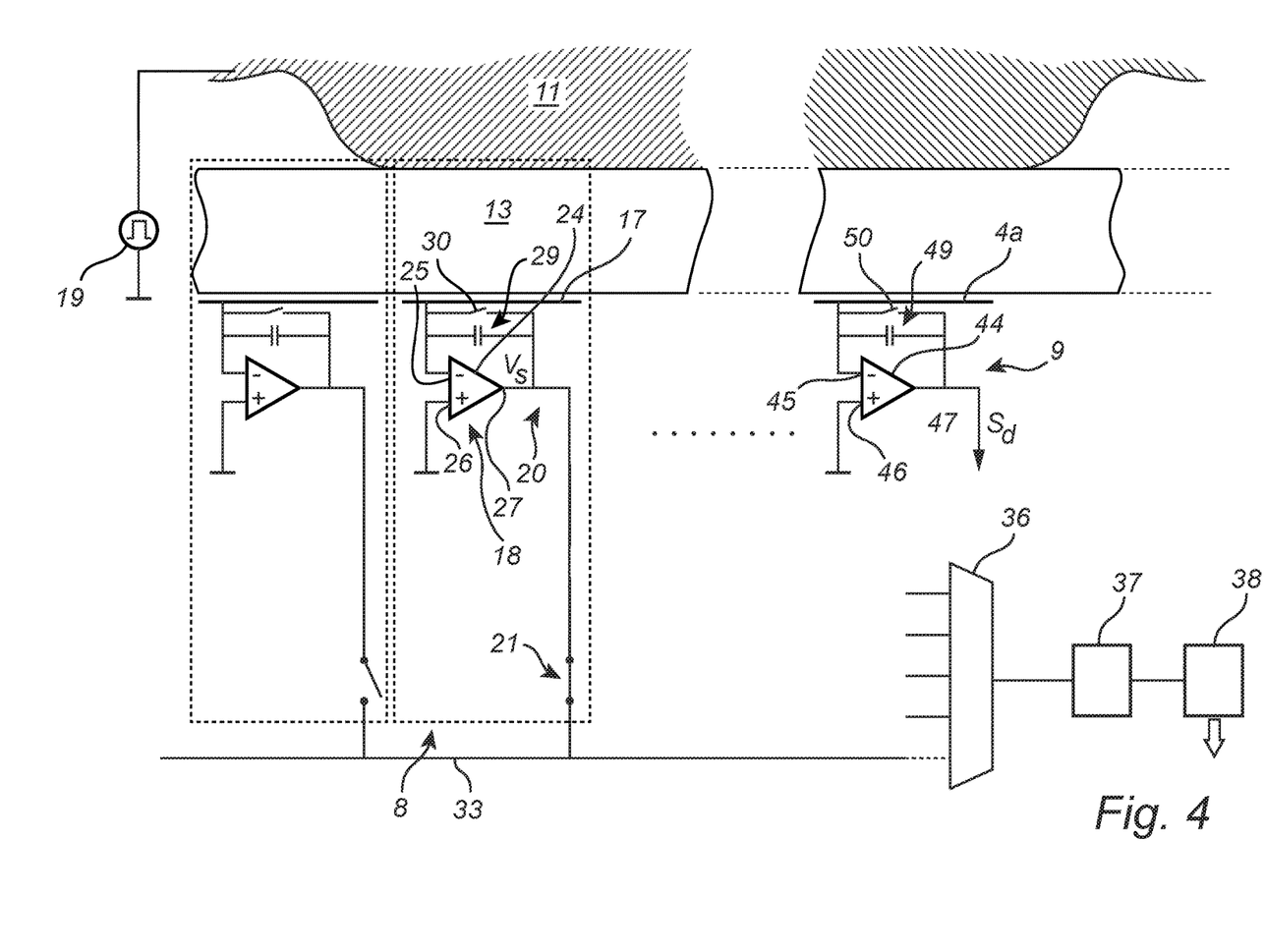
FIG. 4 is a schematic cross-section view of a portion of the fingerprint sensing device in FIG. 3.

FIG. 4 is a schematic cross section of a portion of the fingerprint sensing device 2 in FIG. 2 taken along the line A-A' as indicated in FIG. 2 with a finger 11 placed on top of a protective dielectric top layer 13 covering the sensor array 5 and the finger detecting structure 4a. Referring to FIG. 4, the fingerprint sensing device 2 comprises an excitation signal providing circuit 19 electrically connected to the finger via a conductive finger drive structure (not shown in FIG. 4), a plurality of sensing elements 8, and a finger detection arrangement comprising the finger detecting structure 4a and a finger detection circuit 9 connected to the finger detecting structure 4a.

As is schematically indicated in FIG. 4, each sensing element 8 comprises a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 4, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the sensing structure 17 results in a sensing voltage signal Vs on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array 5 in FIG. 2, is shown in FIG. 4 to be connected to a multiplexer 36. As is schematically indicated in FIG. 4, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 8 to a digital representation of the fingerprint pattern of the finger 11 on the sensor 2.

As is schematically indicated in FIG. 4, the finger detecting circuit 9 is here provided in the form of a charge amplifier similar in principle to the charge amplifier 18 comprised in the sensing element 8 described above. Accordingly, the finger detecting circuit 9 comprises at least one amplifier stage, here schematically illustrated as an operational amplifier (op amp) 44 having a first input (negative input) 45 connected to the finger detecting structure 4a, a second input (positive input) 46 connected to sensor ground or another reference potential, and an output 47. In addition, the charge amplifier comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 4, the output of the finger detecting circuitry is a finger detection signal $S_d$ (in the form of a voltage) indicative of the capacitive coupling between the finger 11 and the finger detecting structure 4a. The signal ratios are formed from the finger detecting signal and the total finger detection signal from all finger detecting structures of the fingerprint sensing device 2.

In FIG. 4, the finger 11 is shown as being connected to an excitation circuit 19 for providing the desired potential difference between the finger 11, and the sensing plates 17 of the sensor array 5 and the finger detecting structure 4a. It should be noted that this desired potential difference may alternatively be provided by changing the ground level of the fingerprint sensing device in relation to the ground level of the electronic device (such as mobile phone 1) in which the fingerprint sensing device 2 is included.

According to a further alternative embodiment, the finger detecting structure 4a may be locally controlled to alternate between a relatively low potential and a relatively high potential. In this alternative embodiment, the charge amplifier of the finger detecting circuit 9 may include a sense transistor having a gate constituting the first input 45. This sense transistor may be formed in a well in a semiconductor substrate and an interface between the well and the substrate may be configured in such a way that current can be prevented from flowing between the well and the substrate. To reduce the influence of a parasitic capacitance between the finger detecting structure and the well in the semiconductor substrate, the positive input 46 of the charge amplifier and the well may be controlled to together swing up and down in potential. This will result in the finger detecting plate 4a also swinging up and down in potential.

Figure 5:
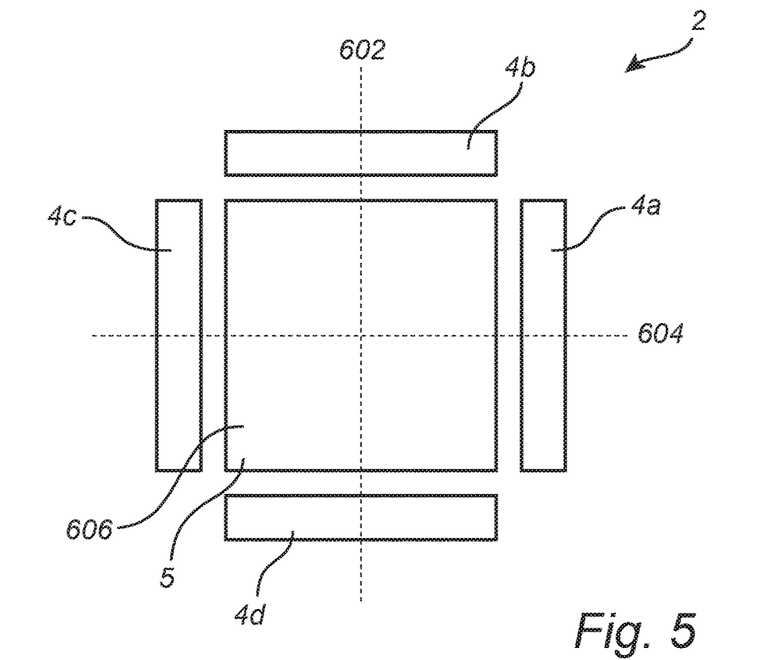
FIG. 5 conceptually shows a fingerprint sensing device divided into four quadrants for a position determination based on signal ratios.

FIG. 5 conceptually shows a fingerprint sensing device divided into four quadrants for position determination based on signal ratios determined from signals acquired and indicative of the portion of the finger detecting structure 4a-d being touched by a finger. The area covered by the fingerprint sensing device 2 is divided into four quadrants by the dashed lines 602 and 604. Assuming in this particular conceptual case that a finger (not shown), at a time instance is touching all four finger detecting structures 4a-d. In this example the finger is touching portions of the finger detecting structures with signal ratios: fingerprint detecting structure 4a with signal ratio of 2/100, fingerprint detecting structure 4b with signal ratio 2/100, fingerprint detecting structure 4c with signal ratio of 48/100, fingerprint detecting structure 4d with signal ratio: 48/100. With these signal ratios, it can be concluded that the finger is positioned mostly over fingerprint detecting structures 4c and 4d and touching relatively small portions of fingerprint detecting structures 4a and 4b. Accordingly, the finger is located mainly in the quadrant 606.

Figure 6A:
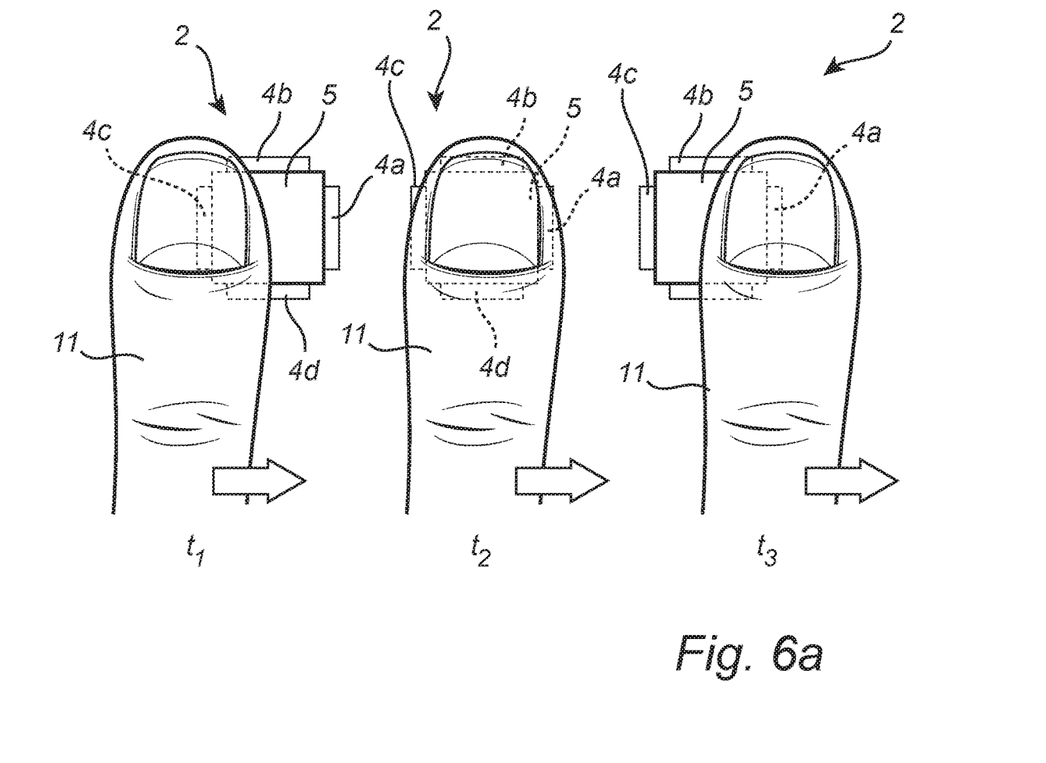
FIG. 6a-b illustrating a horizontal movement finger moving across a fingerprint sensing device and corresponding signal ratios.
Figure 6B:
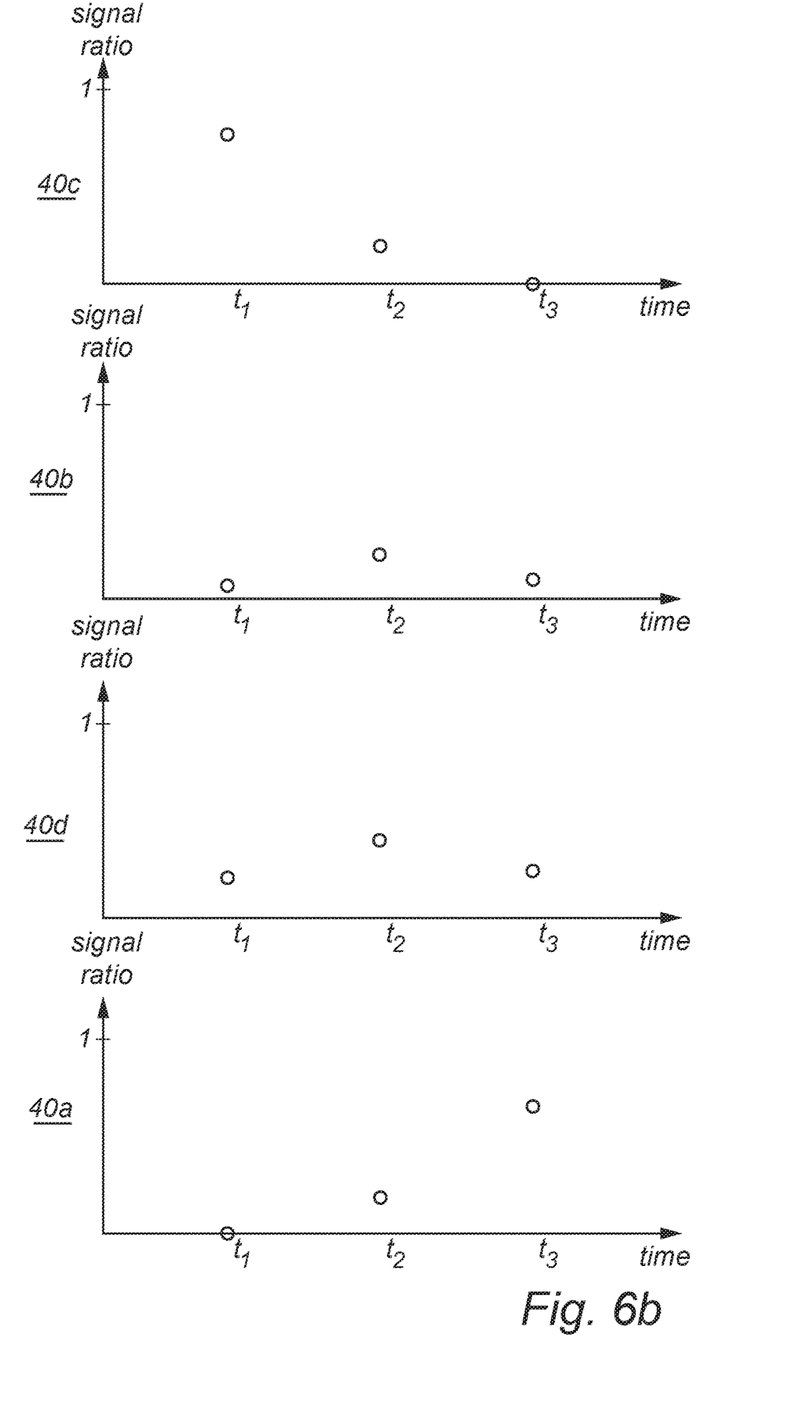

Referring to FIG. 6a-b illustrating a finger 11 moving across the fingerprint sensing device 2 and its finger detecting structures 4a-d (FIG. 6a) and the corresponding signal ratios 40a-d at three time instances (t1, t2, t3), (FIG. 6b). As is shown in FIG. 6a, the finger 11 moves across the fingerprint sensing device from "left" to "right". At a first time t1, the finger 11 is mainly touching the finger detecting structure 4c and only relatively smaller portions of the finger detecting structures 4b and 4d. At a second time instance t2, the finger 11 is touching relatively large portions of the finger detecting structures 4a-d. At a third time instance, the finger is mainly touching the finger detecting structure 4a, and relatively smaller portions of the finger detecting structures 4b-d. FIG. 6b illustrates the signal ratios of the finger detection signal with respect to the accumulated total signal of the finger detection signals from the finger detecting structures 4a-d. Signal ratio 40a is the ratio acquired from finger detecting structure 4a, signal ratio 40b is the ratio acquired from finger detecting structure 4c, signal ratio 40c is the ratio acquired from finger detecting structure 4c, and signal ratio 40d is the ratio acquired from finger detecting structure 4d. Referring only to signal ratio 40c, the ratio 40c is firstly (at $t_1$) relatively high but has subsequently decreased at $t_2$ as the finger 11 touches less of the finger detecting structure 4c. Referring both the FIGS. 6a-b, at the first time instance t1, the finger is mainly touching the finger detecting structure 4c, and the signal ratio 40c is larger than the other signal ratios 40a,b,d. Thereby, it can be concluded that the finger 11 is positioned on the "left" side of the fingerprint sensing device 2 on the same side as the finger detecting structure 4c. Subsequently, at the time instance t2, the signal ratio 40c has decreased and the signal ratios 40a, 40b, 40d has increased. This indicates that the finger is now touching more of the finger detecting structures 40a, 40b and 40d than at time instance t1, and that the finger is touching less of the finger detecting structure 4c than at time t1. Thus, the first position of the finger at the first time instance t1 is different from the second position of the finger at the second time instance t2, and it can be concluded that the finger has moved in a direction from the first position to the second position. As the finger keeps moving, the signal ratios 40c, 40b and 40d have decreased and the signal ratio 40a has increased at time instance t3. Similar to the above discussion, the finger is at time t3 touching more of the finger detecting structure 4a than at time t2 (and t1), and less of finger detecting structure 4b-d. Thus the finger 11 has moved from the second position to a third position in a direction such that the finger 11 touches more of the finger detecting structure 4a than at time t2. Since the signal ratios have changed, the third position is different from the second position and consequently the finger has moved from the second position to the third position. It should be noted that the illustrated time durations between the time instances t1-t3 are conceptual and may in reality be much shorter, with a lower limit set by the sampling frequency of the finger detection evaluation circuit 14 (see e.g. FIG. 3). Furthermore, the finger movement and corresponding ratios and signal magnitudes are conceptual.

Figure 7A:
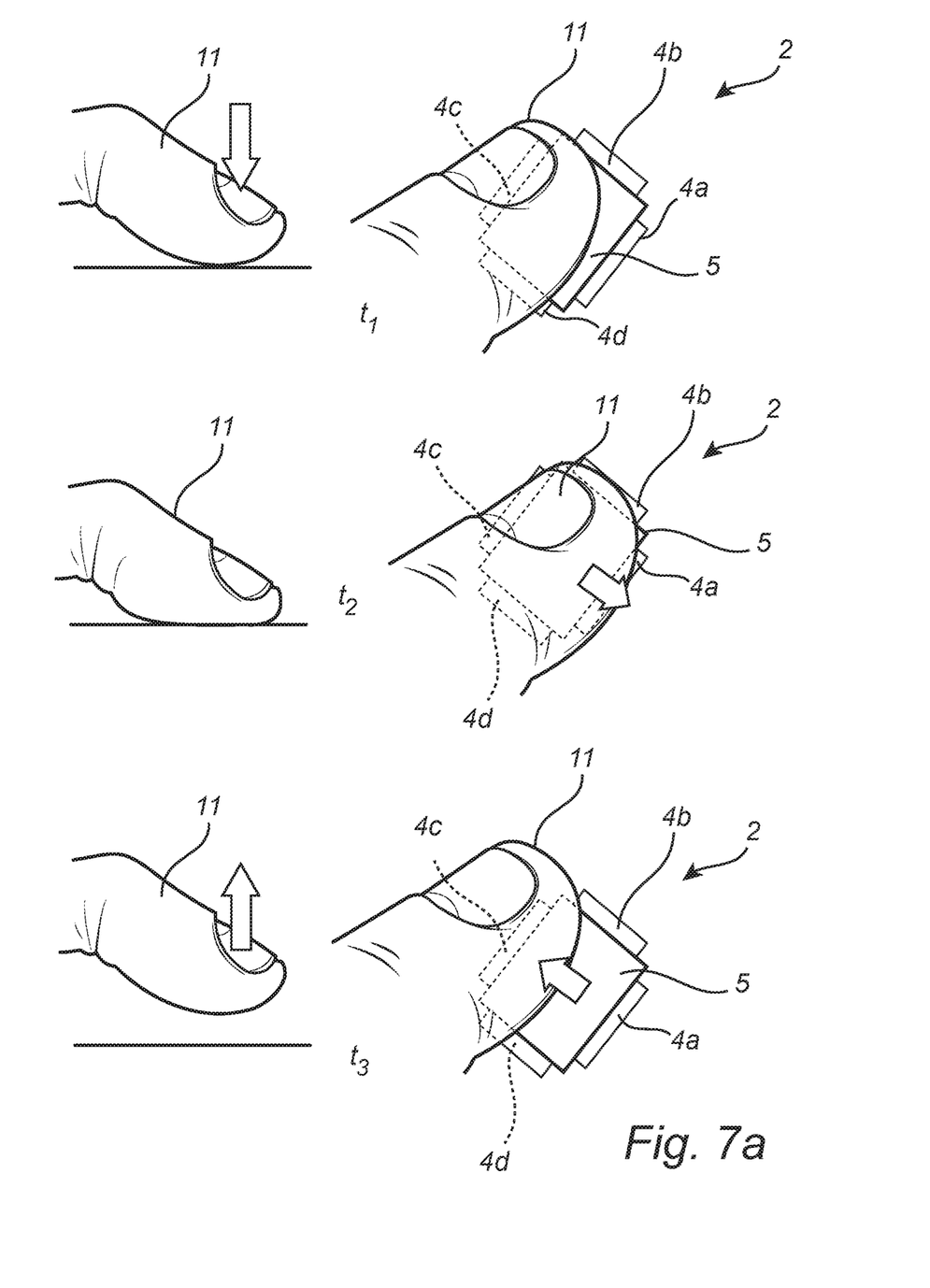
FIG. 7a-b illustrating a vertical movement of a finger towards a fingerprint sensing device and corresponding signal ratios and signal magnitudes.
Figure 7B:
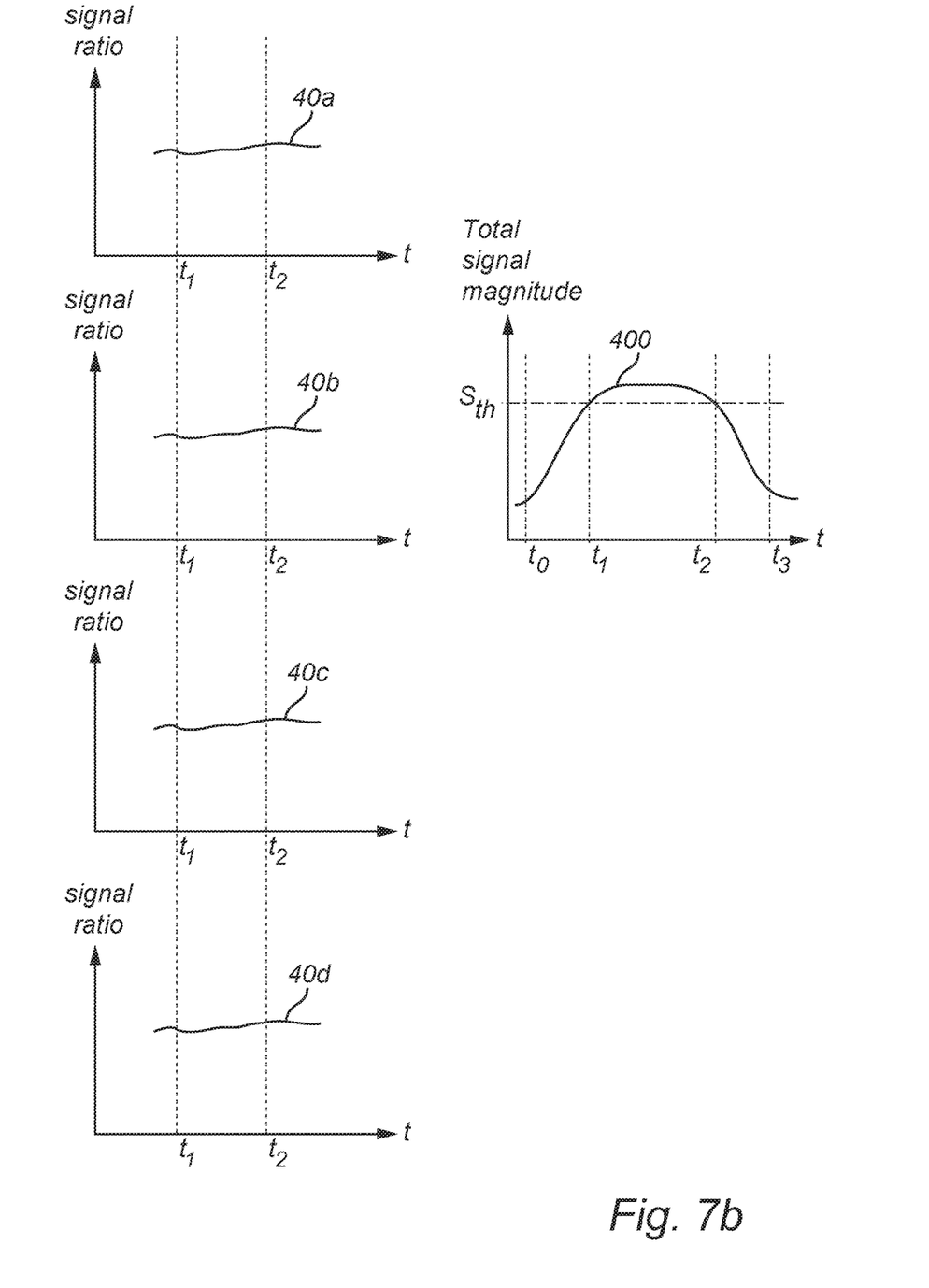

FIG. 7a conceptually illustrates a finger movement event in the form of a vertical movement. Thus, the finger is moving in a direction towards the plane of the finger detecting structures 4a-d. At an initial time instance t0 (not shown), the finger 11 is not touching the finger detecting structures 4a-d, at a first time instance t1 the finger is touching and approaching the finger detecting structures 4a-d, at a second time instance t2, the finger is still touching the finger detecting structures and is maintained in position but the capacitive coupling between the finger 11 and each finger detecting structure 4a-d may have changed, although the position on the fingerprint sensing device is substantially the same. With the finger moving only in the vertical direction, the signal ratios of the finger detecting structures 4a-d are substantially the same as is shown in FIG. 7b. Since the finger is relatively stable in the horizontal direction, each the signal ratios 40a-d at time $t_1$ and time t2 respectively are substantially the same it can be concluded that the first position of the finger 11 on the fingerprint sensing device 2 at time $t_1$ is the same (or at least nearly the same) as the second position at time t2. However, since the finger 11 is moving vertically on the fingerprint sensing device 2, the capacitive coupling between the finger 11 and each of the finger detecting structures 4a-d changes and thereby also the corresponding signal magnitude and the total signal magnitude, which is conceptually shown in FIG. 7b. Each of the signals is indicative of the capacitive coupling between the finger 11 and the respective finger detecting structure 4a-d. The conceptual total signal magnitude 400 is shown in FIG. 7b and is initially low at time $t_0$ when the finger 11 is not touching the finger detecting structures 4a-d, but subsequently the total signal magnitude 400 is above a threshold $S_{th}$ for a time duration from time $t_1$ to time $t_2$, and subsequently below the threshold for a time duration from time $t_2$ to $t_3$. Accordingly, the first position and the second position are substantially the same but the signal magnitudes 400a-d are above the threshold $S_{th}$ for a time duration and subsequently below the threshold. This indicates a vertical movement of the finger and may be used to classify a click-event. Depending on the time duration between the time instances $t_1$ and $t_2$, the click event may be a standard click (short time duration) or a hold-click (longer time duration).

Figure 9:
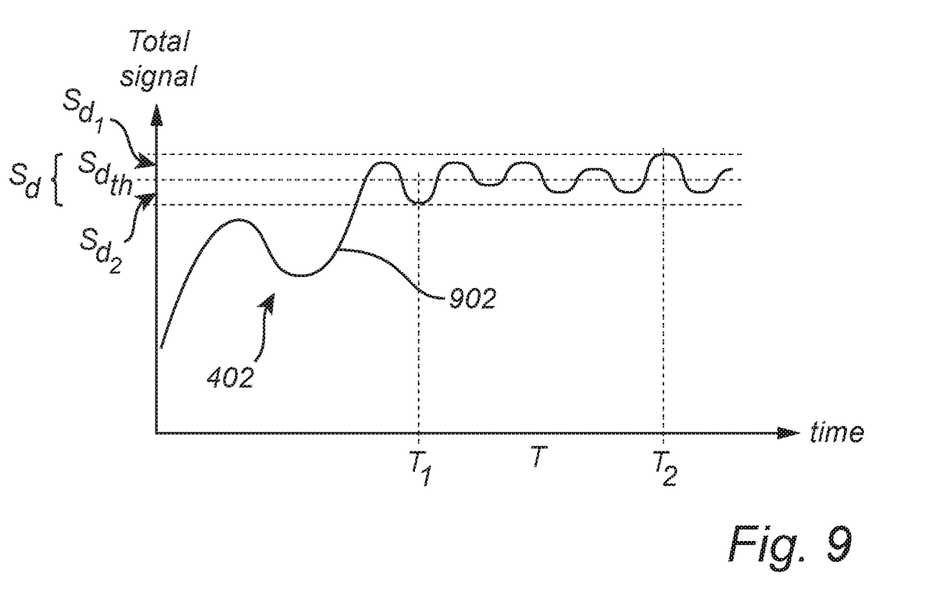
FIG. 9 conceptually illustrates a total signal magnitude when a finger is stable on the fingerprint sensing device.

In a similar manner as to the vertical movement, but instead requiring that the total signal is above a stability level, it can be determined that the finger movement event is that the finger is stable on the fingerprint sensor. In other words, if the first position and the second position is the same as described with reference to the signal ratios 40a-d in FIG. 7b and, as is conceptually shown in FIG. 9 further that the variation of the total signal magnitude 400 is within a stability deviation $S_d$ given by upper stability deviation value $Sd_1$ and lower stability deviation value $Sd_2$ ($Sd_1$ and $Sd_2$ may be equal) with respect to a stability level $Sd_{th}$ during a stability time duration T (from time $T_1$ to time $T_2$) indicates that the finger is stable on the fingerprint sensing device 2. Furthermore, if the signal ratios 40a-d are also equal, it can be concluded that the finger 11 is centralized on the fingerprint sensing device. In this way, an improved fingerprint image quality may be obtained.

In addition, if the fingerprint sensing device is in a navigation mode (i.e. for performing navigation in software on the mobile phone) and if the finger is determined to be stable on the fingerprint sensing device for a navigation time duration, e.g. the first and the second position are substantially the same, the finger movement event may be to perform navigation operations on the mobile phone (or other electronic devices). Based on the first and the second positions a navigation operation may be performed. Referring back to FIG. 5, if the first and the second position is one of the lower quadrants, the navigation operation may be to scroll down in a list, or if the first and the second position is one of the upper quadrants, the navigation operation may be to scroll up in a list. These operations are only exemplary and other operations may be coupled to different locations of the first and the second position on the fingerprint sensing device 2. The navigation operation is similar to a joystick function.

Figure 8:
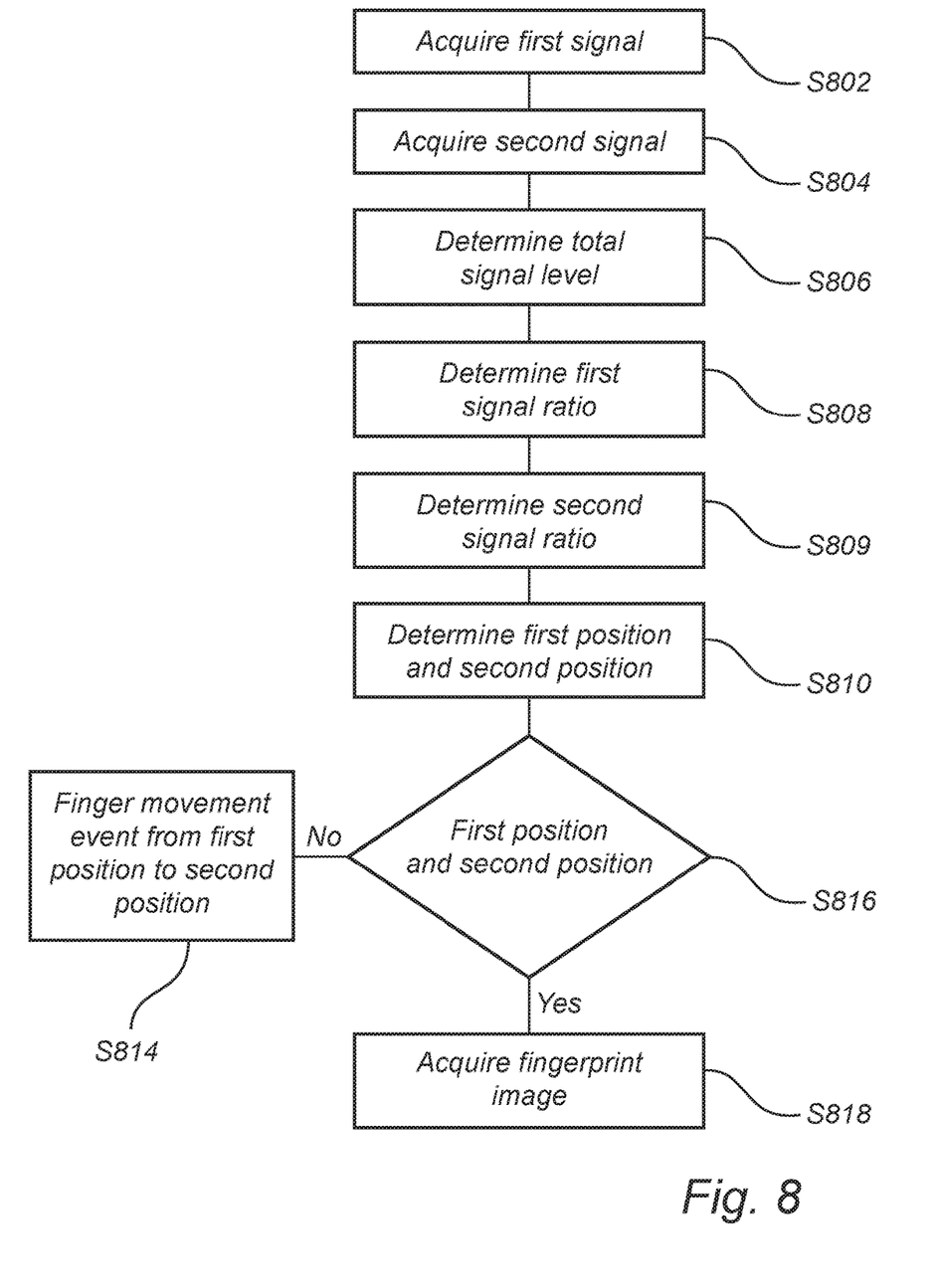
FIG. 8 is a flow-chart schematically illustrating a method according to an embodiment of the present invention.

Now with reference to FIG. 8 showing a flow-chart of method steps according to an embodiment of the invention. In a first step S802 a first signal is acquired indicative of the portion of the first finger detecting structure being touched by a finger. Similarly, in a second step S804, a second signal is acquired indicative of a portion of the second finger detecting structure being touched by the finger. Based on the first signal and the second signal, a total signal level is determined S806. In step S808-S809 a first and a second signal ratio are determined between the first signal and the total signal and the second signal and the total signal, respectively. Subsequently, S810, a first position and a second position with respect to the first finger detecting structure and the second finger detecting structure are determined based on the first signal ratio and the second signal ratio. If it is found in step S812 that the first position is not the same as the second position, it is determined in step S814 that the finger movement event is a movement from the first position to the second position. However, if it is determined that the first position and the second position are substantially the same, it may be determined that the finger is stable S816 if the total signal level is above a stability level for a stability time duration. Subsequently, a fingerprint image may be acquired S918, i.e. the image acquisition control circuitry 12 activates at least a part of the sensor array 5, as well as the sampling circuit 37 and the analog-to-digital converter 38 (referring to FIG. 3 and FIG. 4) to acquire at least a partial image. Subsequently, the fingerprint sensing device 2 may be put back to sleep, or additional fingerprint images may be acquired etc.

In the above embodiments, the finger detection evaluation circuit 14 only wakes up if the signal provided by the finger detection circuitry 9 exceeds a detection threshold. When a signal provided from any of the finger detecting structures 4a-d is above or equal to a detection threshold, it may thus determined that the finger is touching the respective finger detecting structure and the finger detection evaluation circuit 14 may wake up. The signals may be evaluated by a comparator in the finger detection evaluation circuit 14.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for determining a finger movement event on a fingerprint sensor, the fingerprint sensor comprising:
   an array of sensing elements for sensing a fingerprint pattern each sensing element having a sensing structure arranged in a sensing structure plane, and
   at least a first finger detecting structure and a second finger detecting structure arranged adjacent to said array of sensing structures,
   each finger detecting structure being provided in the form of a capacitive plate for sensing a capacitive coupling between a finger and the capacitive plate, each of said capacitive plate having a substantially larger surface area than each of the sensing structures,
   said capacitive plate being connected to finger detector circuitry configured to generate a signal indicative of a finger touching at least part of said first capacitive plate, wherein a magnitude of said first signal is indicative of the area portion of the first capacitive plate being touched by the finger,
   said second capacitive plate being connected to finger detector circuitry configured to generate a signal indicative of a finger touching at least part of said second capacitive plate, wherein a magnitude of said second signal is indicative of the area portion of the second capacitive plate being touched by the finger,
   wherein said method comprises the steps of:
      acquiring a first signal indicative of the portion of the first capacitive plate being touched by a finger,
      acquiring a second signal indicative of a portion of the second capacitive plate being touched by the finger,
      determining a total signal level based on at least said first signal and said second signal,
      determining a first signal ratio between said first signal and said total signal,
      determining a second signal ratio between said second signal and said total signal,
      determining, based on said first signal ratio and said second signal ratio, a first position with respect to said first capacitive plate and said second capacitive plate, and a second position with respect to said first capacitive plate and said second capacitive plate, said second position being determined at a time later than said first position; and
      determining, based on said first position and said second position, a finger movement event.

2. The method according to claim 1, wherein said finger movement event is a movement of said finger in a direction from the first position to the second position.

3. The method according to claim 1, further comprising:
when said first position and said second position are substantially equal and each of said magnitude of the first signal and the magnitude of said second signal are first above a first threshold level during a first time duration and subsequently below a second threshold level for a second time duration,
determining that the finger movement event is a substantially vertical movement of said finger.

4. The method according to claim 1, further comprising:
when said first position and said second position are substantially equal and said total signal magnitude is first above a first threshold level during a first time duration and subsequently below a second threshold level for a second time duration,
determining that the finger movement event is a substantially vertical movement of said finger.

5. The method according to claim 3, further comprising:
when each of said magnitude of the first signal and the magnitude of said second signal are subsequently above said first threshold level during a third time duration and subsequently below a fourth threshold level for a fourth time duration,
determining that the finger movement event is a substantially vertical repetitive movement of said finger.

6. The method according to claim 1, further comprising:
when said first position and said second position are substantially equal for a stability time duration and a variation of the magnitude of the total signal level is within a stability deviation with respect to a stability level during said stability time duration
determining that the finger movement event is that the finger is stable on said fingerprint sensor.

7. The method according to claim 6, further comprising:
controlling said fingerprint sensor to acquire a fingerprint image.

8. The method according to claim 6, further comprising:
when the first ratio and the second ratio are substantially equal for said stability time duration,
controlling said fingerprint sensor to acquire a fingerprint image.

9. The method according to claim 1, further comprising:
when said first position and said second position are substantially equal for a navigation time duration, and each of said magnitude of the first signal and the magnitude of said second signal are above a navigation threshold level during a navigation time duration,
determining that said finger movement event is that the finger is stable; and
providing, based on said first position and said second position, a signal indicative of a navigation operation.

10. The method according to claim 1, further comprising:
when a magnitude of the first signal is above or equal to a detection threshold, determining that the finger is touching the respective capacitive plate.

11. The method according to claim 1, wherein the fingerprint sensor further comprises at least a third finger detecting structure and a fourth finger detecting structure, wherein each finger detecting structure being provided in the form of a capacitive plate for sensing a capacitive coupling between a finger and the capacitive plate, each of said capacitive plate having a substantially larger surface area than each of the sensing elements,
said third capacitive plate being connected to a third finger detector circuitry configured to generate a signal indicative of a finger touching at least part of said third capacitive plate, wherein a magnitude of said third signal is indicative of the portion of the third capacitive plate being touched by the finger,
said fourth capacitive plate being connected to a fourth finger detector circuitry configured to generate a signal indicative of a finger touching at least part of said fourth capacitive plate, wherein a magnitude of said fourth signal is indicative of the portion of the fourth capacitive plate being touched by the finger,
wherein said method further comprises the steps of:
acquiring a third signal indicative of the portion of the third capacitive plate being touched by a finger,
acquiring a fourth signal indicative of the portion of the fourth capacitive plate being touched by a finger,
determining a total signal level based on said first signal, said second signal, said third signal, and said fourth signal
determining a third signal ratio between said third signal and said total signal,
determining a fourth signal ratio between said fourth signal and said total signal,
determining, based on said first signal ratio, said second signal ratio, said third single ratio, and said fourth signal ratio, said first position with respect to said capacitive plates, and said second position with respect to said capacitive plates; and
determining, based on said first position and said second position, said finger movement event.

12. A fingerprint sensing system comprising:
an array of sensing elements for sensing a fingerprint pattern each sensing element having a sensing structure arranged in a sensing structure plane, and
at least a first finger detecting structure and a second finger detecting structure arranged adjacent to said array of sensing structures,
each finger detecting structure being provided in the form of a capacitive plate for sensing a capacitive coupling between a finger and the capacitive plate, said capacitive plate having a substantially larger surface area than each of the sensing elements,
said first capacitive plate being connected to a finger detector circuitry configured to generate a signal indicative of a finger touching at least part of said first capacitive plate, wherein a magnitude of said first signal is indicative of the area portion of the first capacitive plate being touched by the finger,
said second capacitive plate being connected to a second finger detector circuitry configured to generate a signal indicative of a finger touching at least part of said second capacitive plate, wherein a magnitude of said second signal is indicative of the area portion of the second capacitive plate being touched by the finger,
wherein the fingerprint sensing system is configured to:
acquire a first signal indicative of the portion of the first capacitive plate being touched by a finger,
acquire a second signal indicative of a portion of the second capacitive plate being touched by the finger,
determine a total signal level based on at least said first signal and said second signal,
determine a first signal ratio between said first signal and said total signal,
determine a second signal ratio between said second signal and said total signal,
determine, based on said first signal ratio and said second signal ratio, a first position with respect to said first capacitive plate and said second capacitive plate, and a second position with respect to said first capacitive plate and said second capacitive plate, said second position being determined at a time later than said first position; and determine, based on said first position and said second position, a finger movement event.

13. The fingerprint sensing system according to claim 12, wherein the fingerprint sensor further comprises at least a third capacitive plate and a fourth capacitive plate, wherein each capacitive plate having a substantially larger surface area than each of the sensing elements, said third capacitive plate being connected to a third finger detector circuitry configured to generate a signal indicative of a finger touching at least part of said third capacitive plate, wherein a magnitude of said third signal is indicative of the portion of the third capacitive plate being touched by the finger, said fourth capacitive plate being connected to a fourth finger detector circuitry configured to generate a signal indicative of a finger touching at least part of said fourth capacitive plate, wherein a magnitude of said fourth signal is indicative of the portion of the fourth capacitive plate being touched by the finger, wherein the fingerprint sensing system is configured to:

acquire a third signal indicative of the portion of the third capacitive plate being touched by a finger, acquire a fourth signal indicative of the portion of the fourth capacitive plate being touched by a finger, determine a total signal level based on said first signal, said second signal, said third signal, and said fourth signal determine a third signal ratio between said third signal and said total signal, determine a fourth signal ratio between said fourth signal and said total signal, determine, based on said first signal ratio, said second signal ratio, said third single ratio, and said fourth signal ratio, said first position with respect to said capacitive plates, and said second position with respect to said capacitive plates; and determine, based on said first position and said second position, said finger movement event.

14. The fingerprint sensing system according to claim 12, wherein said capacitive plates are arranged at least partly surrounding the sensing structure in the sensing structure plane, the capacitive plates being arranged in opposing pairs with respect to the sensing structures.

15. The fingerprint sensing system according to claim 12, wherein said fingerprint sensor and said finger detecting structures are integrated in the same die.

16. An electronic device comprising:
a control unit; and
a fingerprint sensing system according to claim 12.

17. The electronic device according to claim 16, wherein the fingerprint sensor is a capacitive fingerprint sensor.

18. The electronic device according to claim 16, wherein the electronic device is a mobile phone.

* * * * *